United States Patent [19]

Morishita

[11] Patent Number: 4,633,489

[45] Date of Patent: Dec. 30, 1986

[54] INTERFACE UNIT INSERTED BETWEEN A DATA TRANSFER UNIT AND A PROCESSOR UNIT

[75] Inventor: Shizuo Morishita, Tokyo, Japan

[73] Assignee: NEC Corporation, Tokyo, Japan

[21] Appl. No.: 613,287

[22] Filed: May 24, 1984

[30] Foreign Application Priority Data

May 24, 1983 [JP] Japan .................................. 58-90905

[51] Int. Cl.[4] .............................................. H04L 23/00

[52] U.S. Cl. ....................................... 375/121; 370/91; 178/69 R

[58] Field of Search ..................... 375/36, 121; 370/85, 370/91; 179/2 R, 2 C, 2 DP; 178/69 R

[56] References Cited

U.S. PATENT DOCUMENTS

| | | | |
|---|---|---|---|
| 4,216,389 | 8/1980 | Carter | 375/36 |
| 4,390,969 | 6/1983 | Hayes | 375/121 |
| 4,403,111 | 9/1983 | Kelly | 178/69 R |
| 4,443,884 | 4/1984 | Swarz | 375/121 |
| 4,450,556 | 5/1984 | Boleda et al. | 370/58 |

*Primary Examiner*—Marc E. Bookbinder
*Assistant Examiner*—Stephen Chin
*Attorney, Agent, or Firm*—Schwartz, Jeffery, Schwaab, Mack, Blumenthal & Evans

[57] ABSTRACT

An interface unit is disclosed which can make asynchronous data communication between a transmitter unit and a receiver unit. The interface unit includes a shift register for receiving start data designating a start of data input and input data from the transmitter unit. The start data is used as an interruption signal indicating data input to the receiver unit and is used as an inhibition signal for inhibiting clock application to the transmitter unit. The inhibition of clock application is removed by a control signal transferred from the receiver unit to the interface unit. Clock application to the transmitter unit is restarted in response to the control signal, and a next new data is transferred to the interface unit. Thus, the interface unit can easily and smoothly control asynchronous data communication between the transmitter unit and the receiver unit by means of simple circuits.

9 Claims, 6 Drawing Figures

INTERFACE UNIT INSERTED BETWEEN A DATA TRANSFER UNIT AND A PROCESSOR UNIT

BACKGROUND OF THE INVENTION

1. Field of the Invention

The present invention relates to an interface unit for controlling data transmission between a data processor unit and a data transfer unit, and more particularly to an interface unit for sending asynchronous data from a data transfer unit (e.g. a peripheral unit) to a central processing unit (CPU).

2. Description of the Prior Art

An interface unit is inserted between a CPU and a peripheral unit to control data transmission therebetween. In general, an input-output control unit or a peripheral adapter unit is well known as the interface unit, and is usually used in a data processing system. For instance, the interface unit is inserted between a CPU and a keyboard unit, a printer unit or the like to control a data communication therebetween. The keyboard unit or another data input unit transfers data to the interface unit with an asynchronous timing against the CPU operation. The interface unit applies the asynchronous data received from the keyboard unit to the CPU at a synchronous timing with the CPU operation. Conventionally, a key data input unit called the Universal Synchronous-Asynchronous Receiver-transmitter (USART) is generally used as the interface unit. The USART has many complex circuits on a semiconductor chip, i.e. a receiver circuit receiving a key data from the keyboard, a detection circuit for detecting key data input timing, a transfer circuit for transferring the key data received into the receiver circuit to the CPU, a timer counter, many registers for storing commands sent from the CPU, a decoder circuit for generating control signals according to the decode operation, etc. Therefore, the USART is very expensive. It requires many terminals for coupling the CPU to the keyboard unit and complex operation is necessary to search and to control a start timing of a key input and a transfer timing of the key input.

SUMMARY OF THE INVENTION

An object of the present invention is to provide a low cost interface unit.

Another object of the present invention is to provide an interface unit capable of a data communication between a CPU and a peripheral unit with a simple manner.

The other object of the present invention is to provide an interface circuit integrated in a smaller semiconductor chip, in which a simple circuit for controlling a start and a termination of a data transfer is built.

An interface unit of the present invention has an interface circuit which is integrated in a semiconductor chip and is adapted to be inserted between a CPU and a peripheral unit. The interface circuit has a clock generator circuit and a shift register for receiving such transmission data from the peripheral unit in serial that contains start data for designating a data input at a first location and input data at the following locations. The shift register, after the input data has been received therein, outputs the start data from a shift output and to an interruption terminal coupled to the CPU. The start data acts as an interruption signal for indicating a data transfer to the CPU and acts as a first control signal for stopping clock application to the peripheral unit. After receiving the start data, the CPU allows the input data to come thereinto from the shift register, and after the input data has been transferred from the shift register, the CPU generates a second control signal which is sent to the interface circuit to restart the clock application to the peripheral unit. New input data is then transferred from the peripheral unit to the shift register in response to the clock and the above-mentioned operation is repeated. The interface circuit may have a gate circuit for controlling the clock application to the peripheral unit according to the first and the second control signals.

According to the present invention, the peripheral unit transfers the start data and the input data to the shift register in the interface circuit in synchronism with the clock signal supplied from the interface circuit. The shift register shifts the received data from an input end to an output end one bit by one bit according to the same clock signal as the clock signal supplied to the peripheral unit. The shift register has the same number of shift stages as there are bits of the input data. Therefore, when the last bit of the input data is set in a last stage of the shift register, the start data is outputted from the output end of the shift register. Then the start data is applied to the CPU as an interruption signal. The CPU can detect the data input from the peripheral unit by means of the start data without search operation for searching the data input from the peripheral unit over the entire CPU operation. In addition, the clock application to the peripheral unit is temporarily stopped by the start data itself. Therefore, transmission of a next new input data from the peripheral unit is also inhibited until the CPU catches the input data set in the shift register. Clock application to the peripheral unit is restarted after the CPU has received the input data therein.

Thus, the data transfer operation is synchronized with the CPU operation in a simple manner. Particularly, the interface circuit does not require many complex circuits and many hardware circuits therein, but instead comprises a few simple circuits, and therefore it is inexpensive.

Moreover, input data set in the shift register may be transferred to the CPU in parallel. Further, data transmission to the interface unit may be performed one word by one word, or a plurality of words or bits may be continuously transferred to the interface unit. In the latter case, the start data may be added to only a first word or to every words. Of course the shift register should have a capacity enough to store at least one word of data. A first-in-first-out (FIFO) memory, a queue memory, or the like may be used for the shift register. As mentioned above, it is noted that an interface unit of the present invention can be offered for a reasonable price in a personal computer system, a desk-top type processor system, or the like.

DETAILED DESCRIPTION OF THE PREFERRED EMBODIMENTS

Figure 1:
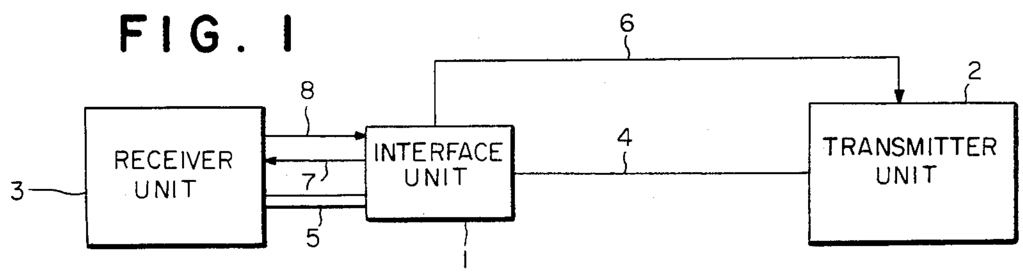
FIG. 1 is a system block diagram of the present invention.

FIG. 1 shows a system block diagram according to an embodiment of the present invention. An interface unit 1 is inserted between a transmitter unit 2 and a receiver unit 3 and is coupled to the transmitter unit 2 and to the receiver unit 3 by means of a data buses 4 and 5, respectively. In this embodiment, a single bit line is used as the data bus 4, while parallel bit lines are used as the data bus 5. The transmitter unit 2 transfers serial input data to the interface unit 1 through the data bus 4 in response to and in synchronism with a clock signal 6 which is applied from the interface unit 1. The serial input data consists of start data for designating data input and input data having a plurality of bits. After the serial input data has been set in the interface unit 1, the interface unit 1 applies an interruption signal 7 to the receiver unit 3 according to the start data which has been received therein and stops clock signal application to the transmitter unit 2. The receiver unit 3 receives the input data from the interface unit 1 at its own timing in response to the interruption signal 7 and sends a control signal 8 to the interface unit 1 in order to indicate a termination of data receipt. The interface unit 1 once again permits the clock application to the transmitter unit 2. Then the clock application is restarted, and a next new input data is transferred to the interface unit 1. This operation is sequentially repeated at every data input.

Figure 2:
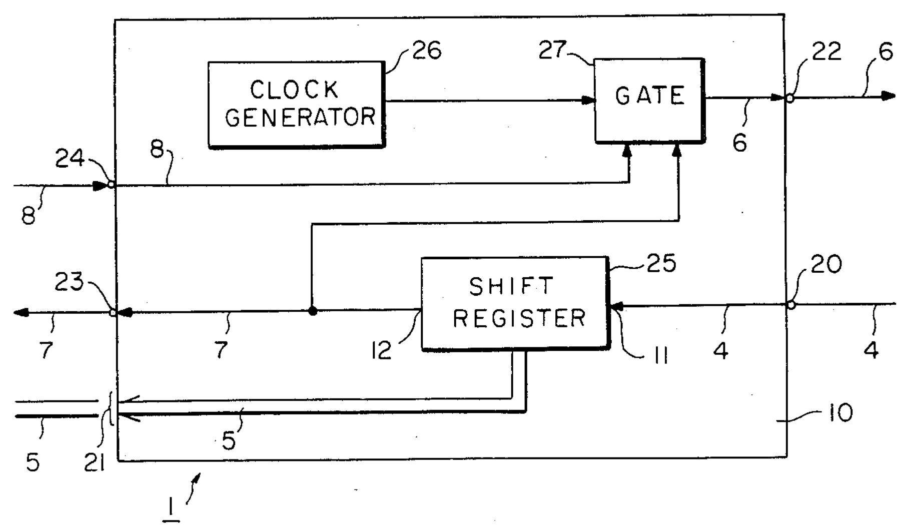
FIG. 2 is a block diagram of an interface unit showing one embodiment of the present invention.

FIG. 2 shows a block diagram of the interface unit 1 in FIG. 1 according to an embodiment of the present invention. In this embodiment, an interface circuit is integrated in a small semiconductor chip 10. The chip 10 includes at least three major circuits, a shift register 25, a clock generator 26 and a gate circuit 27. A terminal 20 is connected to the single data bus 4 and terminals 21 are connected to the parallel data bus 5. The clock signal 6 is applied to the transmitter unit via a terminal 22. The interruption signal 7 and the control signal 8 are transferred to and received from the receiver unit 3 via terminals 23 and 24, respectively. The shift register 25 has the same number of shift stages as there are input data bits and receives a serial input data bit by bit from its input shift end 11. The shift register 25 is constructed such that when a last bit of the serial input data is set in a last stage of the shift register 25, a start data bit of the serial input data is outputted from an output shift end 12. Thus, the start data bit is transferred as the interruption signal 7 to the receiver unit 3 (FIG. 3) via the terminal 23 and is also applied to the gate circuit 27. Consequently, the gate circuit 27 is closed, whereby a clock application to the transmitter unit 2 (FIG. 1) is stopped or inhibited. The clock signal is generated by the clock generator 26 in the embodiment. However, the clock signal may be applied to the gate circuit 27 from the outside of the interface unit 1, for instance from the receiver unit 1 or the like.

The serial input data bits except for the start data bit are sent simultaneously and in parallel to the data bus 5 through terminals 21. The receiver unit 3 takes the input data therein and transfers the control signal 8 to the interface unit 1. The control signal 8 is applied to the gate circuit 27 through the terminal 24, and the gate circuit 27 opens in response to the control signal 8. As a result, clock application to the transmitter unit 2 is restared.

According to this embodiment, a start timing of data input from the transmitter unit and a termination timing of data receipt into the receiver unit are easily controlled by the start data bit and the control signal. Further, synchronous operation with the receiver unit and the transmitter unit can be easily obtained by means of the gate circuit. Moreover, hardware circuits required in the interface circuit may be very simple circuits well known in the art.

Figure 3:
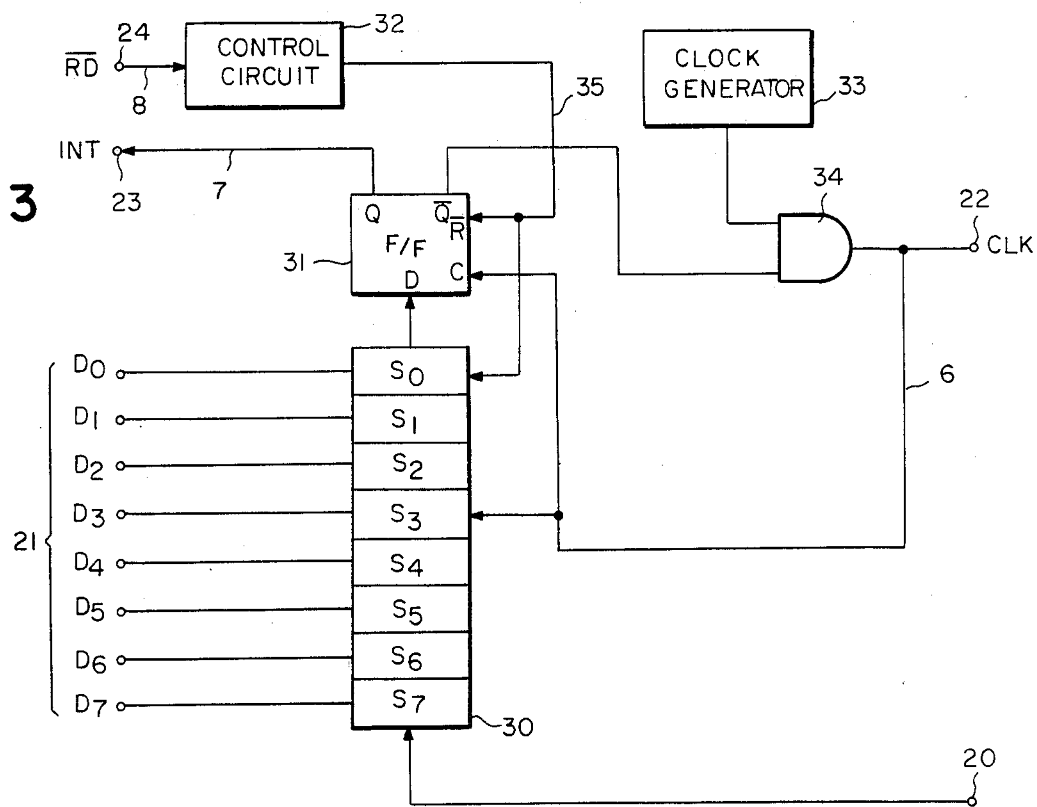
FIG. 3 is a circuit diagram of an interface circuit indicating a preferred embodiment of the present invention.

FIG. 3 is a circuit block diagram of an interface circuit according to a preferred embodiment of the present invention. It is assumed that in this embodiment a word data consisting of eight bits is treated as an input data. This word data is well known as a key code data of a keyboard.

Each word data is transferred to a shift register 30 through the terminal 20 together with a start bit. The start bit is positioned at a leading location of a serial input word. Therefore, nine bits are serially transferred to the shift register 30 for every word. The start bit is shifted from the last stage $S_7$ to the first stage $S_0$ according to a clock signal 6. The clock signal 6 is simultaneously applied to a transmitter unit. Thus, transfer timing of the transmitter unit is synchronized with shift timing of the shift register 30.

Now, when the last bit of word data is set in the last stage $S_7$ of the shift register 30, the start bit is outputted to a flip-flop (F/F) 31. The F/F 31 receives the start bit from a D input end. At this stage, input word data of eight bits has been set in each shift stage of the shift register 30. The F/F 31 generates a interruption signal 7 at its Q output end and an inhibition signal at its $\overline{Q}$ output end. The interruption signal (INT) is applied to the receiver unit through the terminal 23. Simultaneously the inhibition signal is applied to an AND gate 34 to stop an output of a clock signal 6. Consequently, the AND gate 34 is closed and the clock signal 6 generated by a clock generator 33 is stopped by the AND gate 34.

When the receiver unit receives the interruption signal (INT) 7, it takes the input word data $D_0$ to $D_7$ therein through terminals 21 at its own timing, that is, at a timing of the operation of the receiver unit itself. The receiver unit sends the control signal ($\overline{RD}$) 8 to the interface unit through the terminal 24 after word data receipt is completed. The control signal ($\overline{RD}$) 8 is applied to a control circuit 32 and is outputted from the control circuit 32 as a reset signal 35 to the F/F 31 and the shift register 30. The shift register is cleared to an initial condition. Further, the F/F 31 stops an output of the interruption signal 7 and an output of the inhibition signal. Thus, the AND gate 34 is opened and the clock signal 6 is outputted from an output end of the AND gate 34. Therefore, clock application to the transmitter unit is restored.

Figure 4:
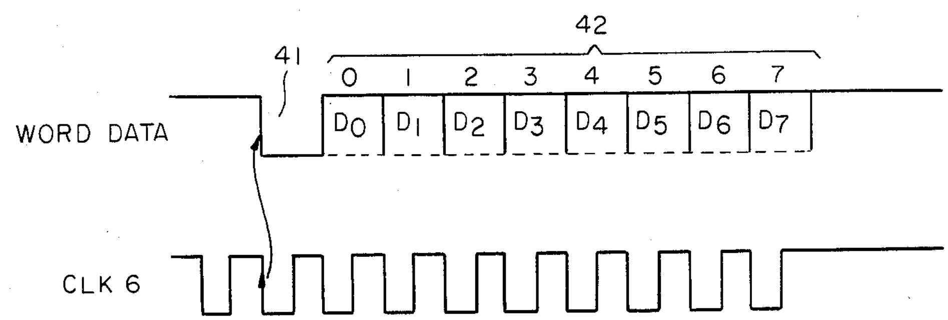
FIG. 4 is a timing chart of data transmission from a transmitter unit to an interface unit of the present invention.

Referring to FIG. 4, word data transmission from the transmission unit to the interface unit will be explained. A word data consisting of one bit start data 41 and eight bits $D_0$ to $D_7$ of input data 42 is transferred to the shift register of the interface unit according to a clock signal (CLK) 6. In this case, the start bit 41 is active with a low voltage level. Each bit is received to the shift register in synchrony with a falling-down edge of clock pulses.

Figure 5:
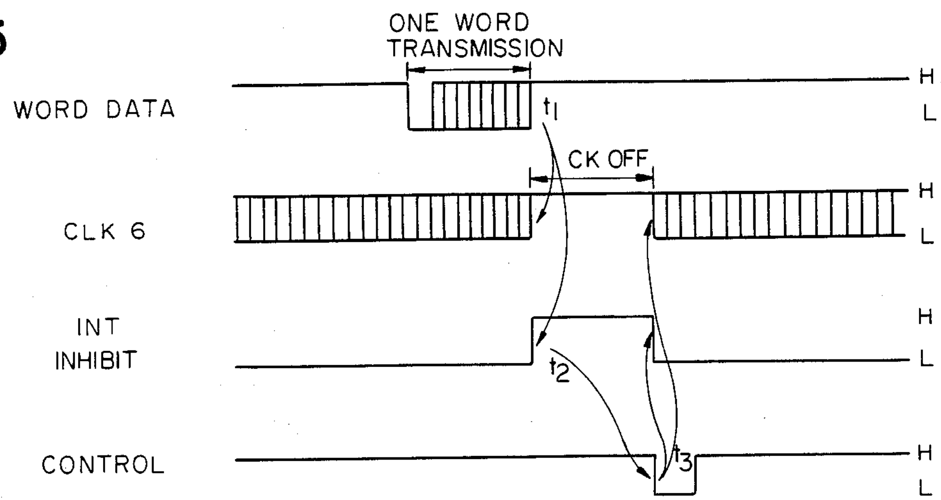
FIG. 5 is a timing chart of data transmission from an interface unit of the present invention to a receiver unit.

After one word data transmission, the interface unit generates the interruption signal (INT) and the inhibition signal (INHIBIT) at a timing $t_1$ in FIG. 5. As a result, clock signal application is stopped. The receiver unit receives eight bit data at a timing $t_2$ in response to the interruption signal (INT). Thereafter the control signal (CONTROL) is sent to the interface circuit at a timing $t_3$. The interface unit restarts clock application in response to the control signal.

Figure 6:
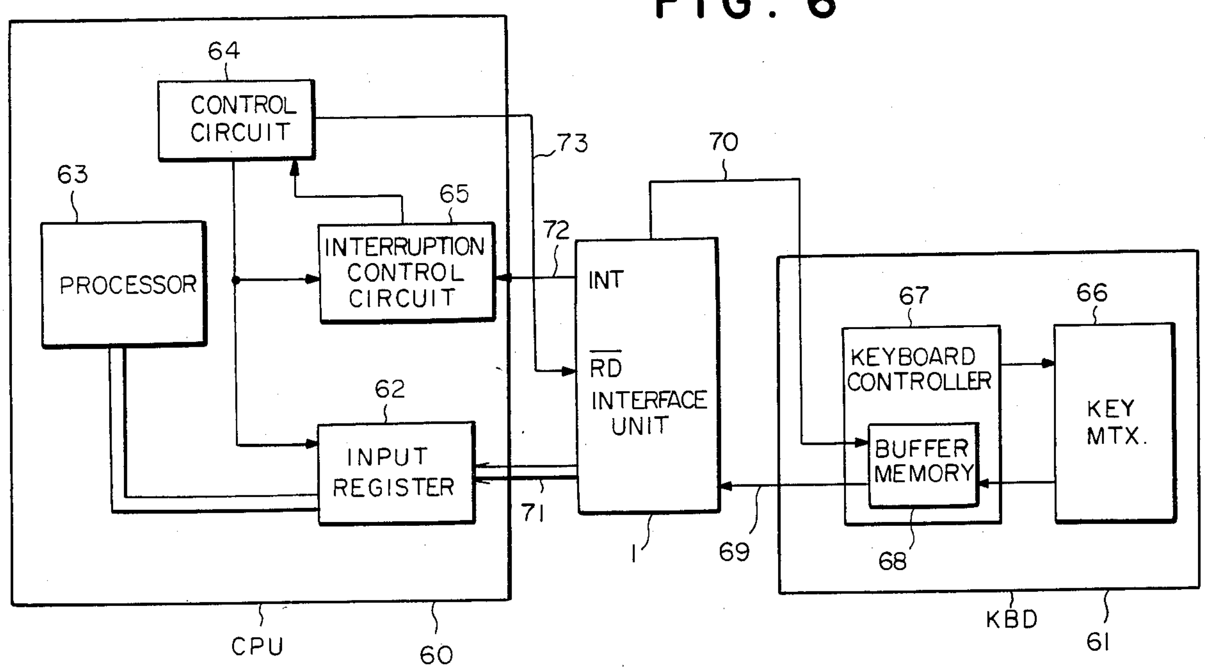
FIG. 6 is a system block diagram of another embodiment of the present invention.

FIG. 6 shows a system block diagram in which the interface unit 1 is inserted between a CPU 60 and a keyboard (KBD) 61. The keyboard 61 includes a key matrix circuit 66 and a keyboard controller 67. The keyboard controller 67 may be constituted of a microprocessor and applies a key scan signal to the key matrix circuit 66. A key data according to a key operation is stored in a buffer memory 68 in the controller 67 in response to the key scan signal. This operation may be executed independently of the operations of the interface unit 1 and the CPU 60. Key data in the memory 68 is transferred to the interface circuit 1 through a bus 69 according to a clock signal 70 one by one. Of course, a start bit is added to each key data by the processor 67. The interface unit 1 sends an interruption signal (INT) 72 to an interruption control circuit 65 of the CPU 60 in response to the start bit received therein. The interruption control circuit 65 applies a signal for indicating a key input to a timing control circuit 64. After the timing control circuit 64 accepts the indicating signal, it sends a reading signal to an input register 62. The input register 62 receives a key data from the bus 71 in response to the reading signal. A processor 63 manipulates the key data of the register 60. The reading signal is also transferred to the interface unit 1 as a control signal 73. Thus, the interface circuit 1 restarts clock application to the keyboard 61 as mentioned above, and receives a new key data buffered in the memory 68.

In the present invention, particularly a start of data input and its termination can be very easily and smoothly controlled by a simple architecture. Therefore, an interface unit can be provided with a low cost.

What is claimed is:

1. An interface unit adapted to be inserted between a data transmitter unit and a receiver unit comprising:

a clock signal terminal through which a clock signal generated by a clock generator is applied to said transmitter unit, a shift register receiving data which is n bits long, with the first bit being a start bit having a predetermined characteristic and the remaining bits being input data bits, said data transferred from the data transmitter unit in response to said clock signal, a first circuit coupled to said shift register and generating a first signal in response to said first bit, said first bit being inputted to said first circuit after said remaining bits are set in said shift register, said first signal being applied to said receiver unit for indicating a start of data input, and said first signal being used to inhibit clock application to said transmitter unit, and a second circuit for receiving a control signal from said receiver unit and for generating a second signal in response to said control signal, said control signal being applied to said second circuit after said receiver unit has received said remaining bits of said shift register in response to said first signal, said second signal being used to reset said shift register and to remove the inhibition of said clock application to said transmitter unit.

2. An interface unit as claimed in claim 1, in which said first bit is shifted through said shift regiser and is applied to said first circuit when said remaining bits have been set in said shift register.

3. An interface unit as claimed in claim 1, in which said clock signal generated by said clock generator is applied to said shift register as a shift clock signal and to said first circuit as a receipt signal of said first bit, and a clock signal application to said shift register and said first circuit is inhibited while said first signal is activated.

4. An interface unit having an interface circuit integrated in a single semiconductor chip comprising:

means for receiving data consisting n bits, the first bit being a start bit indicating data reception from a data transmitter unit and the remaining bits being input data, means for temporarily storing said input data received from said receiving means, means for outputting a clock signal for controlling a receiving operation of said input data, means for producing a first signal indicating data transfer in response to said first bit after said remaining bits have been stored in said storing means, means for transferring said remaining bits temporarily stored in said storing means to outside of said interface unit, means for inhibiting the output of said clock signal according to said first signal, and means for receiving a second signal, said inhibition of said clock signal output being removed by said second signal.

5. A method of transferring data from a transmitted unit to a receiver unit comprising the steps of:

applying a clock signal to said transmitter unit;

shifting data out of said transmitter unit to a shift register in accordance with said clock signal, said data including in order start data and input data;

detecting completion of said data shifting;

inhibiting said application of said clock signal to said transmitter unit and applying a signal to said receiver unit upon said detection;

transferring said data from said shift register to said receiver unit;

detecting a completion of data transfer from said shift register to said receiver unit; and halting inhibition of said application of said clock signal to said transmitter unit to re-apply said clock signal to said transmitter unit upon said detection of completion of data transfer from said shift register to said receiver unit.

6. A system in which data is transferred comprising:

a transmitter unit adapted to send data, said data being $n+1$ bits long with the first bit being a start bit having a predetermined characteristic and the remaining n bits being input data bits;

a receiver unit adapted to receive said input data bits;

an interface unit interposed in a signal path between said transmitter unit and said receiver unit;

clock means for generating clock signals, said clock means being arranged in one of said receiver unit and said interface unit;

said transmitter unit responsive to receipt of said clock signals for transmitting said data only in response thereto;

first detection means arranged in said interface unit, and responsive to said start data, for determining when said data has been transferred to said interface unit, and for producing an indication when said data has been transferred;

means, arranged in said interface unit, for inhibiting application of said clock signal to said transmitter unit in response to said indication;

means for transferring data from said interface unit to said receiver unit in response to said indication; and second detection means, arranged in said receiver unit, for detecting completion of said transfer of data from said interface unit to said receiver unit, and for generating a signal indicative of said detection;

said means for inhibiting being further responsively connected to said second detection means to cease inhibiting application of said clock signal to said transmitter means in response to said signal.

7. A system as claimed in claim 6 wherein said interface unit further comprises a shift register for temporarily storing data transferred from said transmitter unit.

8. An interface unit for connection between a transmitter unit and a receiver unit comprising:

an input terminal receiving data of n+1 bits transferred from the transmitter unit in response to a clock signal, a shift register of n stages coupled to said input terminal and shifting said data of n+1 bits in series from an initial stage to an end state in response to said clock signal, the first bit of said data being shifted out from the end stage of said shift register when the $n+1^{th}$ bit has been stored in the initial stage of said shift register, n bits of said data other than said first bit being temporarily stored in said shift register after said first bit has been shifted out from the end stage of said shift register, a circuit coupled to the end stage of said shift register, said circuit receiving said first bit shifted out from the end stage of said shift register and generating a first signal which is transmitted to said receiving unit, said first signal indicating completion of storage of the n bits of data stored in said shift register, said n bits being transferred from said shift register to said receiver unit when said first signal is transmitted to said receiver unit, and a controller responsive to an acknowledge signal of data reception sent from said receiver unit and initializing said shift register and said circuit according to said acknowledge signal.

9. An interface unit as claimed in claim 8, further comprising means for generating the clock signal, the application of the clock signal to said shift register being inhibited when said first signal is applied to said receiver unit and being restarted in accordance with said acknowledge signal.

* * * * *